(12) United States Patent
Förster et al.

(10) Patent No.: US 8,282,173 B2
(45) Date of Patent: Oct. 9, 2012

(54) ELECTROPNEUMATIC PARKING BRAKE MODULATOR

(75) Inventors: Henning Förster, Nordstemmen (DE); Jörg Helmer, Vogt (DE); Wolfgang Strache, Hemmingen (DE)

(73) Assignee: WABCO GmbH, Hannover (DE)

( * ) Notice: Subject to any disclaimer, the term of this patent is extended or adjusted under 35 U.S.C. 154(b) by 277 days.

(21) Appl. No.: 12/733,649

(22) PCT Filed: Jul. 22, 2008

(86) PCT No.: PCT/EP2008/005969
§ 371 (c)(1),
(2), (4) Date: Jun. 4, 2010

(87) PCT Pub. No.: WO2009/046780
PCT Pub. Date: Apr. 16, 2009

(65) Prior Publication Data
US 2010/0237690 A1    Sep. 23, 2010

(30) Foreign Application Priority Data
Oct. 5, 2007  (DE) .......................... 10 2007 047 691

(51) Int. Cl.
*B60T 13/00* (2006.01)
(52) U.S. Cl. ............................................. 303/7; 303/15
(58) Field of Classification Search .................. 303/3, 7, 303/15, 20, 30, 40, 70, 80–82; 188/112 R
See application file for complete search history.

(56) References Cited

U.S. PATENT DOCUMENTS

| | | | |
|---|---|---|---|
| 4,586,584 A | | 5/1986 | Auman et al. |
| 4,763,959 A | * | 8/1988 | Vandemotter .................... 303/9 |
| 5,046,786 A | | 9/1991 | Johnston et al. |
| 5,061,015 A | * | 10/1991 | Cramer et al. .................... 303/7 |
| 5,445,440 A | * | 8/1995 | Plantan ............................ 303/7 |
| 5,466,053 A | * | 11/1995 | Koelzer ........................... 303/7 |
| 5,553,928 A | * | 9/1996 | Hart et al. ........................ 303/7 |
| 5,615,929 A | * | 4/1997 | Broome ........................... 303/7 |
| 7,832,813 B2 | * | 11/2010 | Bensch et al. .................. 303/15 |
| 2004/0187674 A1 | | 9/2004 | Bennett et al. |
| 2005/0029859 A1 | * | 2/2005 | Bensch et al. .................. 303/89 |
| 2009/0256416 A1 | * | 10/2009 | Bensch et al. .................. 303/17 |

FOREIGN PATENT DOCUMENTS

| | | |
|---|---|---|
| EP | 1 022 204 A2 | 7/2000 |
| EP | 1571061 * | 9/2005 |

* cited by examiner

*Primary Examiner* — Christopher Schwartz
(74) *Attorney, Agent, or Firm* — Kramer Levin Naftalis & Frankel LLP

(57) ABSTRACT

An electropneumatic parking brake modulator for controlling a parking brake mode of trailer brakes in a vehicle/trailer combination includes a valve element for airing and bleeding the trailer spring brake cylinders, at least one compressed air reservoir inlet for airing at least one compressed air line in the parking brake modulator with compressed air from a compressed air reservoir of the towing vehicle, at least one compressed air reservoir outlet at which a reservoir pressure can be made available for the brakes of the trailer, and at least one compressed air control outlet at which a control pressure can be made available for the brakes of the trailer. A towing vehicle protection valve is integrated into the parking brake modulator, and a compressed air line to the compressed air control outlet is automatically blockable when the reservoir pressure made available for the trailer falls below a predetermined threshold value.

11 Claims, 6 Drawing Sheets

ELECTROPNEUMATIC PARKING BRAKE MODULATOR

FIELD OF THE INVENTION

The present invention generally relates to an electropneumatic parking brake modulator for controlling a parking brake function of brakes of at least one trailer vehicle in a vehicle combination including a tractor vehicle and at least one trailer vehicle.

BACKGROUND OF THE INVENTION

Parking brake modulators are installed in pneumatic and electropneumatic brake systems. A parking brake modulator has valves by means of which a pneumatic pressure can be output and provided for releasing a parking brake. For this purpose, combined spring store/diaphragm brake cylinders are conventionally installed for actuating vehicle brakes. A combined spring store/diaphragm brake cylinder differs from a simple brake cylinder, which serves only to actuate a service brake, in that it has a spring store part for the parking brake in addition to a diaphragm part for the service brake, with the parking brake being engaged when the spring store part is in the deaerated state and being released when the spring store part is aerated if the diaphragm part of the spring store/diaphragm brake cylinder is not aerated.

Here, the terms "service brake" and "parking brake" refer to the service brake function and the parking brake function of one or more brakes. The service brake and the parking brake may be realized by the same brake if the brake has both functionalities, that is, a service brake function and a parking brake function.

During driving operation of the vehicle, the spring store parts of the combined spring store/diaphragm brake cylinder are aerated by means of the parking brake modulator, or an air pressure in the spring store parts of the spring store/diaphragm brake cylinder is held. To engage the parking brake, the spring store parts of the combined spring store/diaphragm brake cylinder can be deaerated by means of the parking brake modulator.

The parking brake modulator provides an output reservoir pressure for the trailer vehicle at an outlet. If the brakes of the trailer vehicle have combined spring store/diaphragm brake cylinders, the spring store parts of the combined spring store/diaphragm brake cylinders can be aerated with the reservoir pressure output for the trailer vehicle and provided by the parking brake modulator and can be deaerated. In the event of a drop in the reservoir pressure on the trailer vehicle, a parking brake on the trailer can be automatically engaged as a result.

A tractor vehicle in a vehicle combination often has a tractor vehicle protection valve. By means of the tractor vehicle protection valve, a compressed air line that provides an output pressure for the service brake of the trailer vehicle can be automatically shut off if the reservoir pressure provided for the trailer vehicle falls below a predetermined threshold value. For this purpose, use is conventionally made of a pneumatic holding valve. Without a holding valve of this type, a leaking compressed air line, for example, which provides an output service brake pressure to a trailer vehicle, might lead not only to a failure of the service brake function of the trailer vehicle, but, the output pressure for the service brake of the tractor vehicle could also drop. As a result, it might no longer be possible for the tractor vehicle to be braked in the desired manner.

The tractor vehicle protection valve prevents the output air pressure for the service brake of the tractor vehicle from dropping in the event of a pressure drop of the output air pressure for the reservoir pressure of the trailer vehicle. Here, it is assumed that compressed air possibly escapes both from the compressed air line that provides compressed air to the trailer vehicle for the service brake and also from the compressed air line that provides an output reservoir pressure to the trailer vehicle. This is, for example, the case if the trailer vehicle becomes detached from the tractor vehicle and, in the process, the two pressure lines that connect the tractor vehicle and trailer vehicle are torn away.

The compressed air line that provides a reservoir pressure to the trailer vehicle can then, if appropriate, be shut off from the compressed air reservoir of the tractor vehicle by means of an automatically or manually actuatable valve.

The known, separated design of parking brake modulator and tractor vehicle protection valve has the disadvantage that the tractor vehicle protection valve and at least one compressed air line that connects the tractor vehicle protection valve to the parking brake modulator must be installed separately in addition to the parking brake modulator. This leads to higher costs in the production of the components and during the installation of the components, and to a higher susceptibility to failure on account of the high number of compressed air lines, which can develop leaks. This results in higher costs for servicing and repair and higher costs on account of down time of the vehicle while repairs are carried out.

SUMMARY OF THE INVENTION

Therefore, generally speaking, it is an object of the present invention to provide a more cost-efficient parking brake device of the above-stated type.

By virtue of the claimed invention, a separate tractor vehicle protection valve, by means of which a control pressure provided for the trailer vehicle for actuating a service brake of the trailer can be shut off in the event of a pressure drop of the reservoir pressure provided for the trailer vehicle below a predetermined threshold value, can be dispensed with if the tractor vehicle protection valve is integrated into the parking brake modulator, and such combined design reduces the susceptibility to failure and saves costs. Specifically, the material expenditure for a tractor vehicle protection valve that is integrated into the parking brake modulator is lower than that for a separately installed tractor vehicle protection valve. Furthermore, the number of compressed air inlets and compressed air outlets outside the parking brake modulator and the number of compressed air lines that are connected to the compressed air inlets and to the compressed air outlets is reduced. In particular, it is no longer necessary for a compressed air line to be provided outside the parking brake modulator to connect the parking brake modulator to the tractor vehicle protection valve.

For the integration of the tractor vehicle protection valve into the parking brake modulator, at least one compressed air control inlet and one compressed air control outlet for an output service brake pressure for the trailer vehicle are provided on the parking brake modulator. However, this does not increase the number of compressed air inlets and compressed air outlets outside the parking brake modulator in relation to a separate design, since in the separate design, the tractor vehicle protection valve would have to have a compressed air inlet and a compressed air outlet outside the parking brake modulator for connecting to compressed air lines for the output service brake pressure for the trailer vehicle. In accordance with embodiments of the present invention, the compressed air inlets and compressed air outlets are integrated into the parking brake modulator.

According to an embodiment of the present invention, a pneumatic holding valve is integrated into the parking brake modulator. The holding valve performs the function of the tractor vehicle protection valve in that it can be switched with the reservoir pressure provided for the trailer vehicle and in that, by means of a switch of the holding valve, the compressed air line, which provides a control pressure for the brakes of the trailer vehicle to the compressed air outlet of the parking brake modulator, can be shut off.

The holding valve is a cost-effective valve that can assume at least two states. It is pneumatically controllable. The holding valve switches from a pass-through state to a blocking state if the reservoir pressure for the trailer vehicle, which is used as a switching pressure, falls below a predetermined limit value. The limit value is determined by a spring load that acts counter to the pneumatic pressure for switching the holding valve.

In one advantageous embodiment of the parking brake modulator, the reservoir pressure line to the trailer vehicle can also be automatically shut off from the reservoir pressure provided by the tractor vehicle in the event of a pressure drop below a predetermined threshold value in the parking brake modulator. In this way, a manually actuatable valve for shutting off the reservoir pressure for the trailer vehicle can be dispensed with. An automatic shut-off is also advantageous since it can be carried out a very short time after a pressure drop. A pressure drop in the compressed air reservoirs of the tractor vehicle can therefore be substantially prevented in the event of an undesired pressure drop of the reservoir pressure provided for the trailer. Consequently, the two compressed air lines to the trailer vehicle can be quickly automatically shut off in particular in the event of the compressed air lines being torn away. Here, valves in the parking brake modulator are constructed and arranged such that, in the electrically de-energized state, the reservoir pressure provided for the trailer vehicle can likewise be shut off from the compressed air reservoir of the tractor vehicle.

In another embodiment of the inventive parking brake modulator, the reservoir pressure provided for the trailer vehicle is shut off from the compressed air reservoir of the tractor vehicle not by means of electromagnetic valves, but, rather, pneumatically. A valve can then be automatically pneumatically switched, as a result of a low pressure in the compressed air line to be shut off or as a result of a high flow speed of the compressed air, in order to shut off the compressed air line.

The compressed air reservoir line to the trailer vehicle can advantageously be shut off from the compressed air reservoir of the tractor vehicle by means of electromagnetic valves in the parking brake modulator. For an automatic shut-off in the event of an unexpected pressure drop, the pressure drop can be detected. At least one pressure sensor is required for this purpose. If appropriate, at least one further measured value that is characteristic of the vehicle state can be taken into consideration. It is crucial here that a distinction can be made between a pressure drop during a braking process on account of the braking process and a pressure drop on account of the reservoir pressure line to the trailer vehicle being torn away or on account of leakage in the reservoir pressure line. A value that is characteristic of the vehicle state during a braking process is for example a braking demand signal, a measured value from an acceleration sensor or a measured value from a rotational speed sensor at a wheel of the vehicle.

A pressure drop in the reservoir pressure line to the trailer vehicle can advantageously be detected not only on the basis of a single measured value. Specifically, a pressure drop can be detected more quickly on the basis of a pressure gradient over time and/or spatial pressure gradient. A pressure gradient over time can be determined from at least two measured values recorded at different times. The measured values may be measured values from a single pressure sensor or may also be the measured values from a plurality of pressure sensors. A spatial pressure gradient can be determined on the basis of measured values from at least two pressure sensors. One pressure sensor is advantageously situated close to a compressed air reservoir outlet of the parking brake modulator, which provides the reservoir pressure for the trailer vehicle. The reservoir pressure close to a compressed air reservoir inlet of the parking brake modulator for the reservoir pressure can advantageously be measured by a second pressure sensor. If a sudden pressure drop of the reservoir pressure for the trailer vehicle occurs, then this can be detected in a very short time both on the basis of the spatial pressure gradient and also on the basis of the pressure gradient over time. At least one of the pressure gradients can therefore advantageously be taken into consideration as to whether a valve for shutting off the compressed air reservoir line should be actuated.

The determination of a pressure drop by means of a gradient has the advantage that an unexpected pressure drop can be detected much more quickly than is possible if only a single measurement value is taken into consideration and the measurement value is compared with a reference value. It is consequently possible to prevent an unnecessarily large amount of compressed air from escaping from the compressed air reservoirs of the tractor vehicle if compressed air escapes via the outlet for the reservoir pressure provided for the trailer vehicle.

In one advantageous embodiment of the parking brake modulator, the control pressure for the trailer vehicle is not only provided to the parking brake modulator at at least one compressed air control inlet in order to be able to shut off the compressed air control inlet in the direction of the trailer vehicle by means of the tractor vehicle protection valve, the control pressure can now be modulated in the parking brake modulator. In particular, the control pressure provided to the trailer vehicle can be increased beyond the control pressure prevailing at a compressed air control inlet of the parking brake modulator. Here, the service brake of the trailer vehicle can be actuated by means of the parking brake modulator even when the service brake of the vehicle is not actuated. An at least temporary parking brake function in the trailer vehicle can therefore be produced by means of the service brake of the trailer vehicle. Furthermore, during a braking process, an output brake pressure can be increased. The trailer vehicle can therefore be braked more intensely than the tractor vehicle. An anti-jackknifing brake can therefore be provided by means of the parking brake modulator. An anti jackknifing brake of such type serves to keep a vehicle combination straight when travelling on gradients. Furthermore, the anti-jackknifing brake can advantageously be used in the event of slippery roadways and serves for testing the braking action of the trailer vehicle or for testing the connection of the tractor vehicle to the trailer vehicle.

The control pressure provided to the trailer vehicle is advantageously at least as high as the control pressure prevailing at the control pressure inlet of the parking brake modulator. A control pressure that is modulated in the parking brake modulator should be able to increase if appropriate, but not decrease, the control pressure provided for the trailer vehicle in relation to the control pressure prevailing at the compressed air control inlet of the parking brake modulator.

Specifically, the trailer should not be braked too lightly in relation to the tractor vehicle as this might lead to a breakaway of the tractor vehicle during a heavy braking process.

Therefore, a select-high valve is installed in the parking brake modulator, which selects the higher of the control pressure prevailing at the compressed air control inlet of the parking brake modulator and a pressure that is modulated in the parking brake modulator, and provides the higher pressure to the trailer vehicle as a control pressure.

A modulated pressure can be output by means of at least one valve and provided by the valve. Here, the modulated pressure can be increased by means of the valve up to a reservoir pressure of the tractor vehicle. In another state of the valve, the pressure in the compressed air line that connects the valve to the select-high valve can be held constant. The pressure, which is held constant, serves to predefine a minimum pressure for the control pressure of the trailer vehicle, which is not undershot even if a control pressure at the compressed air control inlet of the parking brake modulator is lower. In a further switching position of the valve, the compressed air line from the valve to the select-high valve can be deaerated. In the deaerated state of the compressed air line, the control pressure provided to the trailer is equal again to the control pressure prevailing at the inlet of the parking brake modulator.

In another advantageous embodiment, the valve by means of which the control pressure provided for the trailer vehicle can be increased is the same valve as that with which the reservoir pressure for the trailer vehicle can be modulated. The valve then serves to modulate both the control pressure provided to the trailer and also the reservoir pressure provided to the trailer. It is advantageous here that two compressed air lines can be deaerated via one valve and only one deaeration outlet need be provided for deaerating the two compressed air lines. Although a further valve may be required to switch between the two compressed air lines, the further valve is less expensive than a second valve for modulating a pressure.

Still other objects and advantages of the present invention will in part be obvious and will in part be apparent from the specification.

The present invention accordingly comprises the features of construction, combination of elements and arrangement of parts, all as exemplified in the constructions herein set forth, and the scope of the invention will be indicated in the claims.

BRIEF DESCRIPTION OF THE DRAWINGS

For a fuller understanding of the present invention, reference is had to the following exemplary embodiments, which are explained in more detail hereinafter on the basis of the accompanying drawings, in which.

DETAILED DESCRIPTION OF THE PREFERRED EMBODIMENTS

Figure 1:
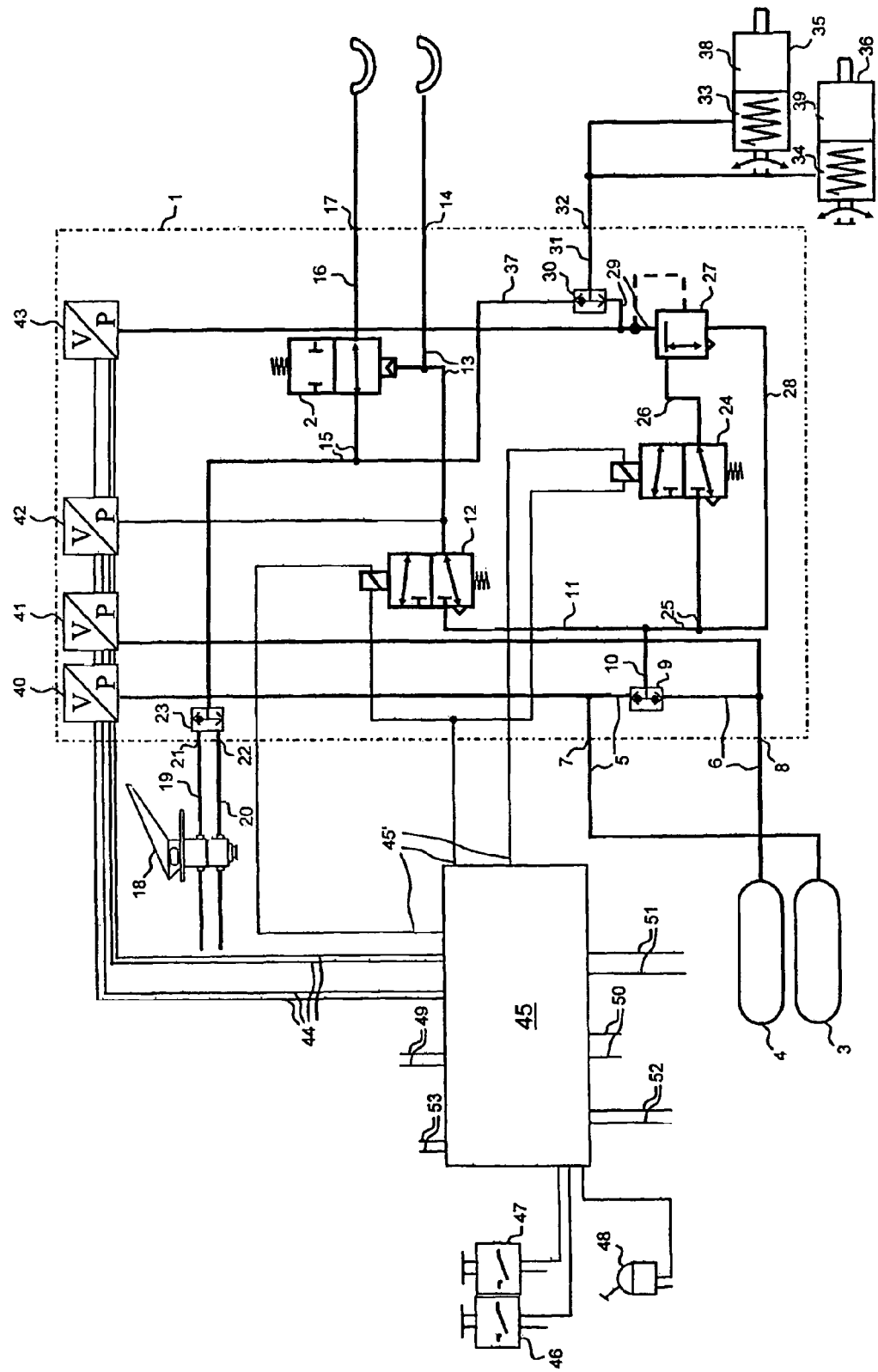
FIG. 1 is a simplified schematic diagram of a compressed air brake system having a parking brake modulator and an integrated tractor vehicle protection valve according to a first exemplary embodiment of the invention.

Referring now to the drawing figures, FIG. 1 schematically shows a part of a compressed air brake system for a vehicle combination. In particular, FIG. 1 shows a parking brake modulator 1 with a holding valve 2 integrated therein. From a first compressed air reservoir 3 and a second compressed air reservoir 4, compressed air can be provided to the parking brake modulator 1 via compressed air lines 5 and 6 and compressed air reservoir inlets 7 and 8 of the parking brake modulator 1. In the parking brake modulator 1, a double check valve 9 provides the higher of the pressure in the compressed air lines 5 and 6 to a compressed air line 10. At the same time, the double check valve 9 prevents an escape of compressed air in the parking brake modulator 1 via the compressed air reservoir inlets 7 and 8.

The compressed air line 10 is connected via compressed air line 11 to an electromagnetic valve 12. A reservoir air pressure can be provided to a trailer vehicle by means of the electromagnetic valve 12 via a compressed air line 13 and a compressed air reservoir outlet 14. For this purpose, the electromagnetic valve 12 is electrically energized. In the electrically de-energized state of the electromagnetic valve 12, the compressed air lines 11 and 13 are separated from one another. The compressed air line 13 can be deaerated via the electromagnetic valve 12 in the electrically de-energized state. The holding valve 2, which is a pneumatic valve, can be pneumatically actuated via the compressed air line 13. In the aerated state of the compressed air line 13, that is, when a trailer vehicle is coupled to a tractor vehicle that has the parking brake modulator and the air pressure reservoir of the trailer vehicle is aerated via the compressed air line 13, the holding valve 2 connects compressed air lines 15 and 16. An output air pressure for actuating the service brake function of the trailer vehicle can then be provided at a compressed air control outlet 17 via the compressed air line 16.

A pneumatic pressure can be output in two compressed air lines 19 and 20 by a brake pedal device 18. The compressed air output with the pressure passes via compressed air control inlets 21 and 22 of the parking brake modulator 1 to a select-high valve 23, that is, a shuttle valve with return flow. By means of the select-high valve 23, the compressed air line 15 can be acted on with the higher of the pressures of the compressed air lines 19 and 20. Consequently, when the compressed air line 13 is aerated, the higher of the pressures at the compressed air control inlets 21 and 22 passes to the compressed air control outlet 17. In the event of a drop in the air pressure in the compressed air line 13 or at the compressed air reservoir outlet 14 below a predetermined threshold value, the connection between the compressed air control outlet 17 or compressed air line 16 and the compressed air line 15, and therefore the compressed air control inlets 21 and 22, can be shut off. In the event of the trailer being torn off, the two compressed air lines 13 and 16 are normally deaerated via the compressed air reservoir outlet 14 and the compressed air control outlet 17. When the compressed air line 13 is deaerated, the holding valve 2 then switches into the state in which the compressed air line 15 is separated from the compressed air line 16. Consequently, output compressed air in the compressed air lines 19 and 20, which can be provided to the parking brake modulator 1 via the compressed air control inlets 21 and 22, cannot escape via the holding valve 2, the compressed air line 16 and the compressed air control outlet 17.

The parking brake modulator 1 also has devices for releasing the parking brake, that is, for deactivating the parking brake function in the tractor vehicle. For this purpose, an electromagnetic valve 24 can be connected to the compressed air reservoirs 3 and 4 via a compressed air line 25, the compressed air line 10, the double check valve 9 and the compressed air lines 5 and 6. In a first, electrically energized state of the electromagnetic valve 24, a compressed air line 26 is connected by means of the electromagnetic valve 24 to the compressed air line 25 and aerated. In a second, electrically de-energized state of the electromagnetic valve 24, the compressed air line 26 is deaerated by means of the valve 24. In this way, an air pressure can be output in the compressed air line 26 by means of the electromagnetic valve 24.

The air quantity of the air pressure output by the electromagnetic valve 24 in the compressed air line 26 can be boosted by means of an air-quantity-boosting valve unit 27. For this purpose, the air-quantity-boosting valve unit 27 is connected via a compressed air line 28 to compressed air from the compressed air reservoirs 3 and 4. The compressed air with its air quantity boosted by the air-quantity-boosting valve unit 27 can be supplied to a compressed air outlet 32 of the parking brake modulator 1 via a compressed air line 29, a select-high valve 30, that is a shuttle valve with return flow, and a compressed air line 31. Spring store parts 33 and 34 of combined spring store/diaphragm brake cylinders 35 and 36 can be aerated with the compressed air provided at the compressed air outlet 32. In the aerated state of the spring store parts 33 and 34, the parking brake of the tractor vehicle is released. As a result of a deaeration of the compressed air line 26 via the electrically de-energized electromagnetic valve 24, the spring store parts 33 and 34 of the combined spring store/diaphragm brake cylinders 35 and 36 are deaerated via the air-quantity-boosting valve unit 27. In the deaerated state of the spring store parts 33 and 34 of the combined spring store/diaphragm brake cylinders 35 and 36, the parking brake of the tractor vehicle is engaged, that is, the parking brake function is activated.

The select-high valve 30 is connected with a first inlet to the compressed air line 29. With a second inlet, the select-high valve 30 is connected via a compressed air line 37 to the compressed air line 15 and therefore via the select-high valve 23 to the compressed air control inlets 21 and 22. Specifically, when the parking brake is engaged, compressed air with a pressure generated in the brake pedal device 18 aerates the diaphragm parts 38 and 39 of the combined spring store/diaphragm brake cylinders 35 and 36 via a compressed air line, which is not illustrated. The compressed air line 37, the select-high valve 30 and the compressed air line 31 ensures that the air pressure in the spring store parts 33 and 34 of the combined spring store/diaphragm brake cylinders 35 and 36 is always at least as high as the air pressure in the diaphragm parts 38 and 39 of the combined spring store/diaphragm brake cylinders 35 and 36. In this way, the application forces provided by the parking brake and the application provided by the service brake in the combined spring store/diaphragm brake cylinders 35 and 36 are not added. In fact, the application force is always equal to the greater of the two application forces that are provided by means of the parking brake and the service brake. An overloading of brakes is thereby prevented.

For the automatic control of the parking brake modulator 1, the latter has pressure sensors 40, 41, 42 and 43. The pneumatic pressure in different compressed air lines in the parking brake modulator 1 can be measured by means of the pressure sensors 40, 41, 42 and 43. The pressure sensor 40 measures the reservoir pressure provided at the compressed air reservoir inlet 7. The reservoir pressure provided at the compressed air reservoir inlet 8 can be measured by means of the pressure sensor 41. The reservoir pressure provided to the trailer vehicle at the compressed air reservoir outlet 14 can be measured by the pressure sensor 42. The air pressure in the compressed air line 29, which is output by means of the electromagnetic valve 24 and boosted in terms of quantity in the air-quantity-boosting valve unit 27, can be measured by means of the pressure sensor 43.

The pressure sensors 40, 41, 42 and 43 are connected via data lines 44 to a control unit 45. Pressure values measured by the pressure sensors 40, 41, 42 and 43 can be received by the control unit 45 via the data lines 44. Furthermore, the electromagnetic valves 12 and 24 can be controlled via electrical lines 45'. The air pressure in the compressed air lines 13 and 26 can thereby be regulated by the control unit 45.

The control unit 45 also has further connections. Signals for engaging or releasing the parking brake of the tractor vehicle can be transmitted by means of an actuating device 46. To engage the parking brake of the trailer vehicle, an actuating device 47 can be actuated, by means of which signals can be transmitted to the control unit 45. Signals can be transmitted by means of an actuating device 48 to the control unit 45, by means of which the brake pressure for the service brake of the trailer vehicle can be controlled or regulated.

Furthermore, the control unit 45 has a connection for data lines 49 by means of which data can be exchanged with a module (not illustrated) in the trailer vehicle for controlling and, if appropriate, monitoring the brakes in the trailer vehicle. Furthermore, data lines 50 and 51 are provided, by means of which CAN communication or SAE communication can be established with the control unit 45.

For the supply of energy, the control unit 45 preferably has duplex electrical line pairs 52, 53 for connecting to an energy supply, in particular a battery. The line pairs 52, 53, which are therefore of redundant design, increase the operational reliability of the control unit 45 and therefore also the operational reliability of the parking brake modulator 1. In the event of failure of one of the two line pairs 52, 53, the electromagnetic valves 12 and 24 in the parking brake modulator 1 can be controlled by the control unit 45 via the electrical lines 45' by means of the energy provided by the other energy supply.

The present invention provides different options for detecting a pressure loss at the compressed air reservoir outlet 14. The different options may be used individually or also in combination.

One option for detecting a pressure loss is realized by means of the pressure sensor 42. By comparing the pressure measured by means of the pressure sensor, 42 with a predefined minimum pressure, a pressure loss at the compressed air reservoir outlet 14 can be inferred in the event of the minimum pressure being undershot if the electromagnetic valve 12 is in the electrically energized state. If a pressure drop at the compressed air reservoir outlet 14 is detected and feasible, then the electromagnetic valve 12 can be switched by means of the electrical lines 45' into the electrically de-energized state. A further drop also of the reservoir air pressure in the compressed air reservoirs 3 and 4 below the predetermined threshold value as a result of a deaeration of the compressed air reservoirs 3 and 4 via the compressed air reservoir outlet 14 is thereby prevented.

In a further embodiment, a drop in the air pressure at the compressed air reservoir outlet 14 can be detected by comparing two measured values of the pneumatic pressure measured with a time interval. It is likewise possible for measured values from the pressure sensor 42 to be used for this purpose. This, therefore, results in a pressure gradient over time that can be compared with a maximum admissible value. The maximum admissible value may be dependent here on further values that are characteristic of the vehicle state, in particular of a braking process, and may be variable. Specifically, the measured value of the pressure gradient over time is non-zero even during a braking process initiated by means of the brake pedal device 18. Consequently, the admissible limit value can be selected to be greater in this situation, that is, during a braking process.

By comparing the pressure measured by means of the pressure sensor 42 with the pressures measured by means of the pressure sensors 40 and 41, it is also possible for at least one spatial pressure gradient to be detected. The spatial pressure gradient is also non-zero during a braking process. However, in the event of the compressed air line 13 to the trailer vehicle being torn away and a fast escape of compressed air via the compressed air reservoir outlet 14, a spatial pressure gradient measured in this way assumes greater values than during a braking process without a further pressure loss as a result of a line being torn away. Consequently, it is also possible here for a limit value to be selected as a function of further values that are characteristic of the braking process, and it is possible to detect if the compressed air line 13 to the trailer vehicle is torn away by comparing the measured spatial pressure gradient with the selected limit value. In the event of the limit value being exceeded, the electromagnetic valve 12 can be switched into the electrically de-energized state.

The select-high valves 23 and 30, like the double check valve 9, can be integrated into the parking brake modulator 1. The combined design saves costs and reduces the risk of leakage. In contrast to the exemplary embodiment of FIG. 1, however, it is also possible for at least one of the three valves 23, 30 or 9 to be arranged outside the parking brake modulator 1.

In particular, in an embodiment that differs from the embodiment of FIG. 1, the double check valve 9 is situated outside the parking brake modulator 1. The compressed air lines 5 and 6 and the pressure sensors 40 and 41 that measure the pressure in the compressed air lines 5 and 6 are then likewise situated outside the parking brake modulator 1. Instead of the compressed air reservoir inlets 7 and 8 through which the compressed air lines 5 and 6 are guided in the embodiment of FIG. 1, the different embodiment of the parking brake modulator 1 requires only one compressed air reservoir inlet through which the compressed air line 10 is guided.

In a different embodiment of the parking brake modulator 1, the pressure in the compressed air line 10 can be measured by means of the pressure sensor alternatively or in addition to the pressures in the compressed air lines 5 and 6 being measured by the pressure sensors 40 and 41. The pressure sensor is situated outside the parking brake modulator 1 in one embodiment of the present invention and inside the parking brake modulator 1 in another.

In the case of a double check valve 9 situated outside the parking brake modulator 1, the pneumatic pressure at the then single compressed air reservoir inlet, through which the compressed air line 10 is guided, can be measured by means of the pressure sensor. In a further embodiment with a double check valve 9 installed within the parking brake modulator 1, the higher of the pressures prevailing at the compressed air reservoir inlets 7 and 8 can be measured by means of the pressure sensor.

Figure 2:
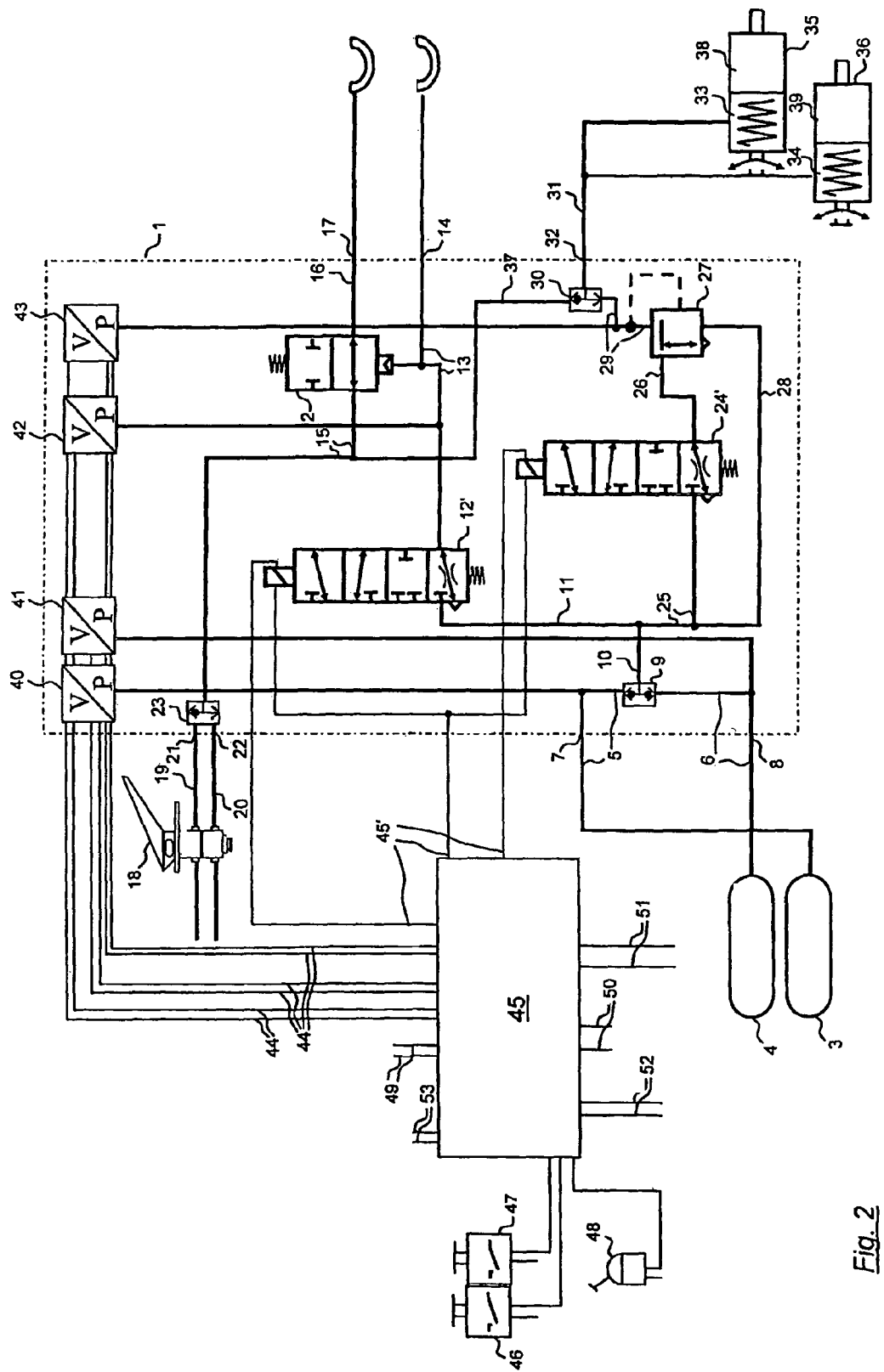
FIG. 2 is a simplified schematic diagram of a compressed air brake system having a parking brake modulator and an integrated tractor vehicle protection valve according to a second exemplary embodiment of the invention.

FIG. 2 shows selected parts of a compressed air brake system for a vehicle combination having the parking brake modulator according to a further exemplary embodiment of the invention into which a tractor vehicle protection valve is integrated. The difference with respect to the exemplary embodiment according to FIG. 1 is in the design of the electromagnetic valves 12' and 24'. Specifically, the two electromagnetic valves 12' and 24' have in each case four possible states. In the electrically de-energized state of the electromagnetic valve 12' or 24', the compressed air line 13 or the compressed air line 26 respectively can be deaerated in a throttled manner. This is advantageous in particular in the event of a failure of the electronics, where the electromagnetic valves 12' and 24' switch into the electrically de-energized state for example even during driving. Here, a fast deaeration of the compressed air lines 13 and 26 would lead to a fast engagement of the parking brake in the tractor vehicle, and if appropriate of the parking brake in the trailer vehicle. As a result of the throttled deaeration of the compressed air lines 13 and 26, a few seconds to minutes pass before the parking brake in the tractor vehicle and if appropriate in the trailer vehicle is fully engaged. Consequently, locking of wheels occurs more slowly.

Furthermore, the electromagnetic valves 12' and 24' in FIG. 2 have, in contrast to FIG. 1, the additional "holding" switching state. In such switching state, the compressed air line 13 or compressed air line 26 is neither aerated nor deaerated via the electromagnetic valve 12' or 24', respectively. This reduces the consumption of compressed air when an output air pressure in the compressed air line 13 or in the compressed air line 26 is to be held. To hold the air pressure by means of the electromagnetic valve 12 or 24 in FIG. 1, the electromagnetic valve repeatedly switches between the aerating and deaerating states. During deaeration, however, compressed air escapes from the compressed air line 13 or 26, which is then fed in again from a compressed air reservoir in the aerating switching state. The electromagnetic valves 12' and 24' according to FIG. 2 prevent such loss of compressed air. Less compressed air need be provided by means of a compressor. Fuel can therefore be saved. If appropriate, the compressor may even be selected to be smaller, that is of lower power, and may therefore be more cost effective. The further arrangement of the components in the parking brake modulator 1 is to the same as the arrangement described in the description regarding FIG. 1. Furthermore, a certain pressure can be set more uniformly.

Figure 3:
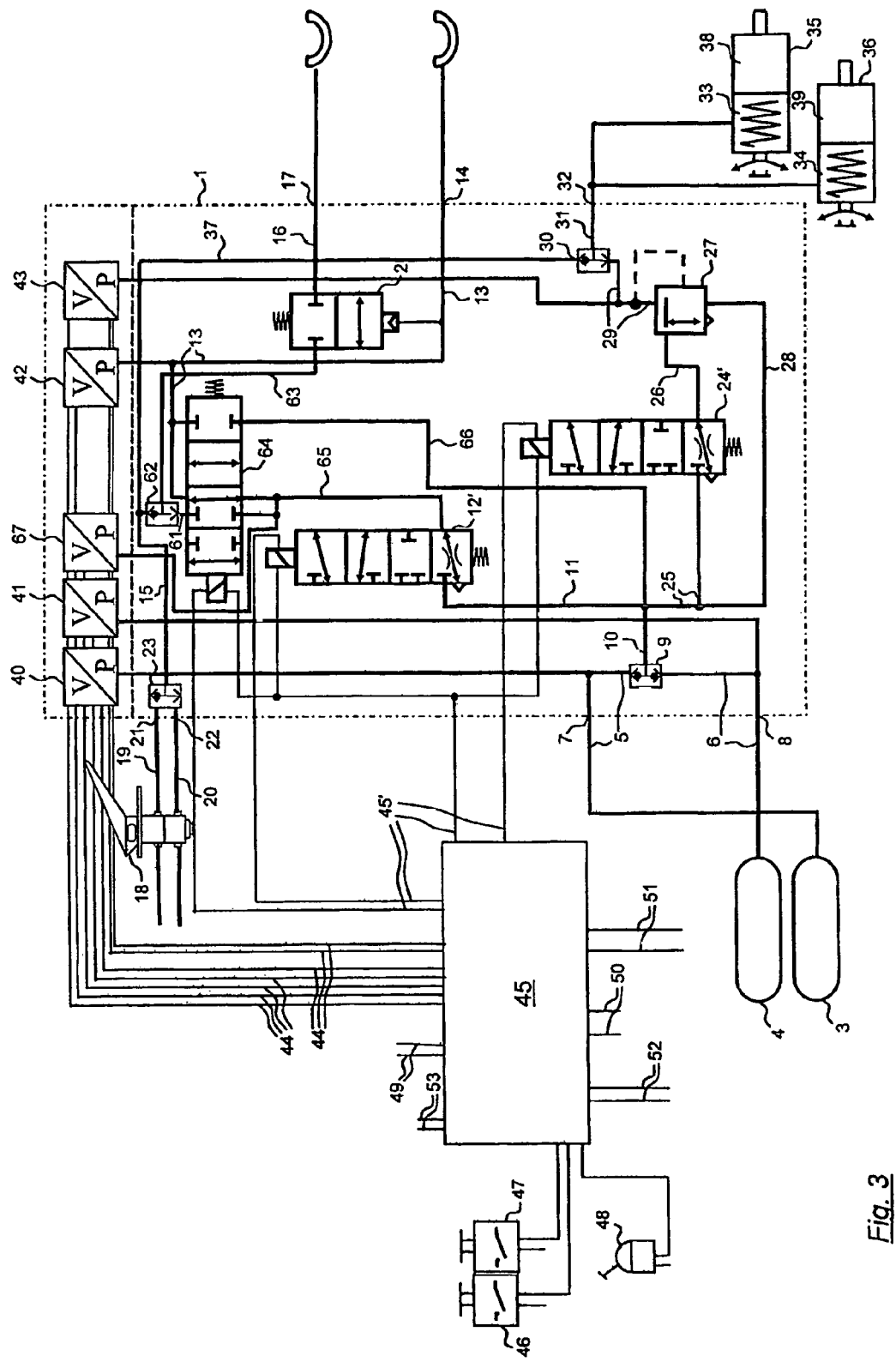
FIG. 3 is a simplified schematic diagram of a compressed air brake system having a parking brake modulator with a facility for modulating the trailer control pressure and an integrated tractor vehicle protection valve according to a third exemplary embodiment of the invention.

FIG. 3 shows an exemplary embodiment of the parking brake modulator 1 in which, in contrast to the exemplary embodiments of FIG. 1 and FIG. 2, the control pressure that can be provided at the compressed air control outlet 17 for the trailer vehicle can additionally be modulated in the parking brake modulator 1. For this purpose, the higher of the pressures prevailing at the compressed air control inlets 21 and 22 is transmitted via the select-high valve 23 not directly via the compressed air line 15 to the holding valve 2, the compressed air line 16 and the compressed air control outlet 17. A modulated pressure is provided in a compressed air line 61. The higher of the pressures in the compressed air lines 15 and 61 can be provided via a select-high valve 62 and a compressed air line 63 via the holding valve 2 and the compressed air line 16 to the compressed air control outlet 17 for the trailer vehicle. The control pressure provided at the compressed air control outlet 17 for the trailer vehicle is consequently always at least as high as the higher of the pressures output in the brake pedal device 18 and prevailing at the compressed air control inlets 21 and 22. This ensures that the trailer vehicle is braked at least as intensely as the tractor vehicle. This keeps the vehicle combination stable during a braking process.

The modulation of the control pressure for the trailer vehicle can be carried out by means of the electromagnetic valve 12' already provided in the exemplary embodiments of FIGS. 1 and 2. Specifically, it is possible by means of an electromagnetic valve 64 for a compressed air line 65 connected to the outlet of the electromagnetic valve 12' to be connected alternatively via the compressed air line 13 to the compressed air reservoir outlet 14 or via the compressed air line 61 to the select-high valve 62. In the electrically de-energized state of the electromagnetic valve 64, the mode of operation of the exemplary embodiment of FIG. 3 is the same as the mode of operation of the exemplary embodiment of FIG. 2. In contrast, in the electrically energized state of the electromagnetic valve 64, the air pressure provided at the compressed air control outlet 17 by means of the electromagnetic valve 12' can be increased in relation to the air pressures prevailing at the compressed air control inlets 21 and 22. In the electrically energized state of the electromagnetic valve 64, it is also possible for the compressed air line 13 to be connected to the compressed air line 10, and therefore via the compressed air lines 5 and 6 to the compressed air reservoirs 3 and 4, via the electromagnetic valve 64 and a compressed air line 66. Consequently, in the electrically energized state of the electromagnetic valve 64, the higher of the pressure prevailing at the compressed air reservoir inlets 7 and 8 prevails at the compressed air reservoir outlet 14. Spring store parts of spring store/diaphragm brake cylinders, which may be provided in the trailer vehicle, are then aerated. The parking brake is not engaged, and the trailer vehicle is not braked by means of the parking brake; that is, the parking brake function of the trailer vehicle is then activated.

In driving operation, a modulation of the reservoir air pressure for the trailer vehicle is not required. Therefore, in driving operation, the existing electromagnetic valve 12' can advantageously be used for modulating the control pressure for the trailer vehicle. An anti jackknifing braking function, for example, can therefore be produced by means of the service brake. In comparison with the exemplary embodiments of FIG. 1 and FIG. 2, the exemplary embodiment of FIG. 3 has an additional pressure sensor 67. Specifically, the compressed air line 65 is not connected via the compressed air line 13 to the pressure sensor 42 in every situation. Therefore, the pressure modulated in the compressed air line 65 by means of the electromagnetic valve 12' can be measured by means of the pressure sensor 67. For cost reasons, it would be possible, with a reduced resolution of the line tear-away detection capability, to dispense with the pressure sensor 42.

In this exemplary embodiment, it is, if appropriate, also possible for measured values from the pressure sensor 67 to be taken into consideration for detecting a pressure drop at the compressed air reservoir outlet 14.

The pressure sensors 40, 41, 42, 43 and 67 are integrated into the parking brake modulator 1. Alternatively, at least one, a plurality or all of the pressure sensors 40, 41, 42, 43 and/or 67 is/are not integrated into the parking brake modulator 1. At least one compressed air line then leads out of the parking brake modulator 1, in which an air pressure can be measured by means of at least one of the pressure sensors 40, 41, 42, 43 and/or 67. For cost reasons, however, the integrated design is preferable over the separate design.

Figure 4:
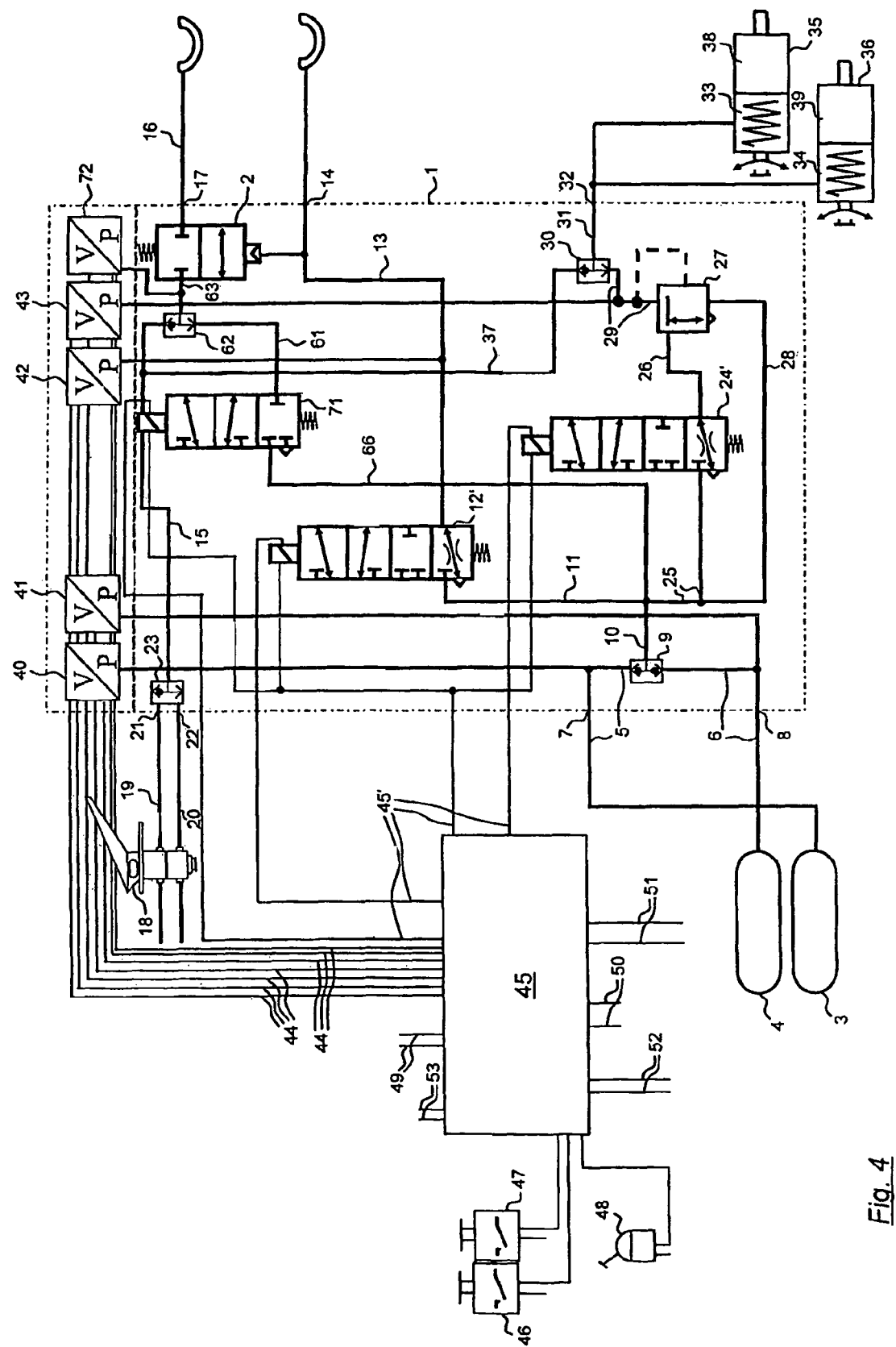
FIG. 4 is a simplified schematic diagram of a compressed air brake system having a parking brake modulator with a facility for modulating the trailer control pressure and an integrated tractor vehicle protection valve according to a fourth exemplary embodiment of the invention.

FIG. 4 shows a further exemplary embodiment in which, as in the exemplary embodiment in FIG. 3, an air pressure in a compressed air line 61 can be modulated, as a result of which the control pressure provided at the control pressure outlet 17 of the parking brake modulator 1 for the trailer vehicle can be increased in relation to the pressures generated at the brake pedal device 18 and prevailing at the compressed air control inlets 21 and 22 of the parking brake modulator 1.

In contrast to the exemplary embodiment in FIG. 3, the exemplary embodiment in FIG. 4 does not use the electromagnetic valve 12' for modulating the pressure in the compressed air line 61. In fact, the pressure in the compressed air line 61 can be modulated by means of an electromagnetic valve 71 and the compressed air line 66. Specifically, the compressed air line 66 can be supplied with compressed air from the compressed air reservoirs 3 and 4.

The electromagnetic valve 71 has three possible states. In the electrically de-energized state of the electromagnetic valve 71, the compressed air line 66 is separated from the compressed air line 61. The output pressure in the compressed air line 61 can then be held. In two other states, the compressed air line 61 can be either aerated or deaerated via the electromagnetic valve 71.

A connection to a further pressure sensor 72 is provided in the compressed air line 63. Measured values from the pressure sensor 72 are used to regulate the modulated pressure for the anti jackknifing braking function. A tear-away of the compressed air line 16, with an associated pressure loss at the compressed air control outlet 17, can be detected by means of the pressure sensor 72 if the holding valve 2 is still in the pass-through position; that is, if the pressure in the compressed air line 13 still lies above a predefined limit value.

Figure 5:
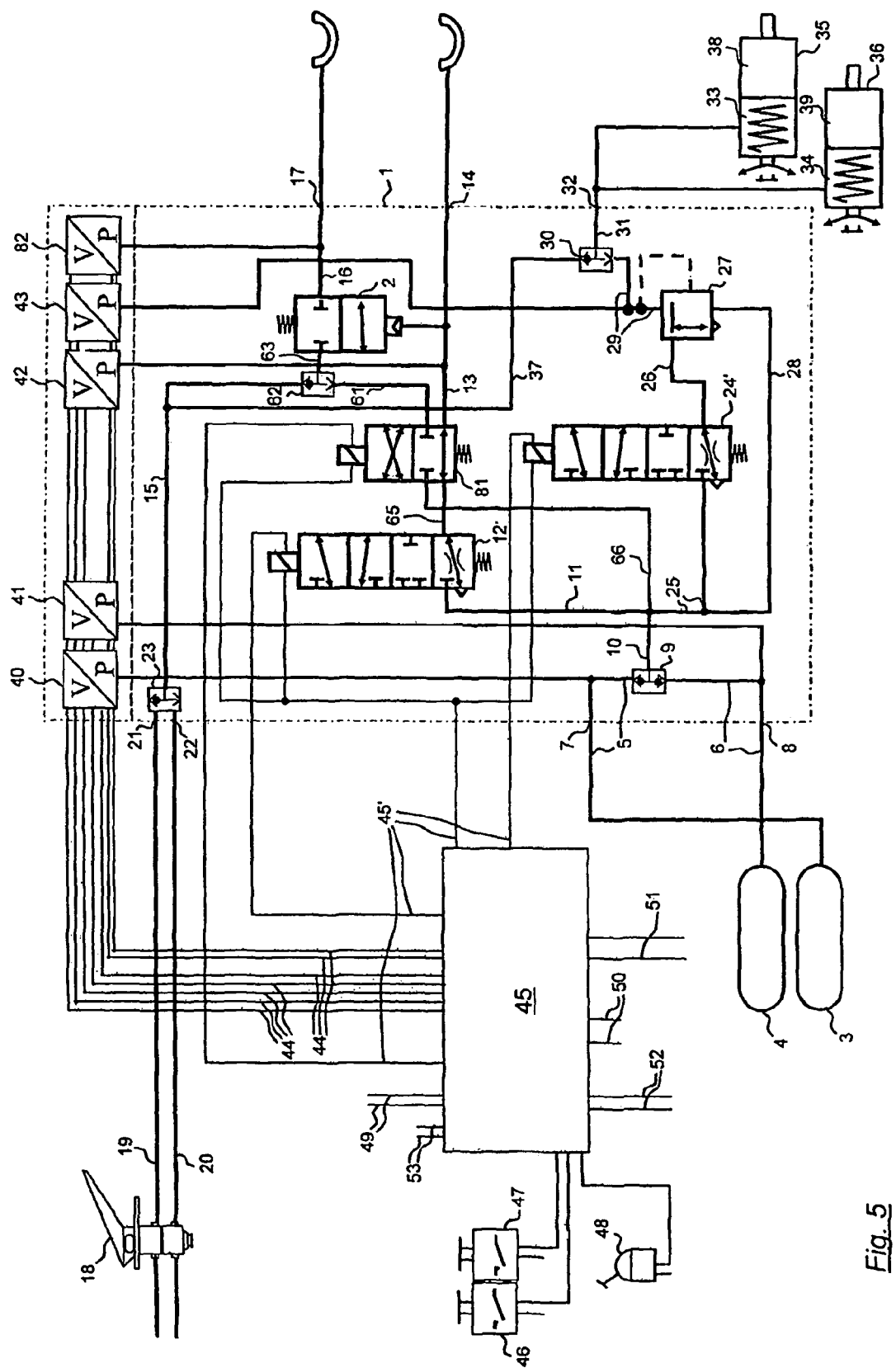
FIG. 5 is a simplified schematic diagram of a compressed air brake system having a parking brake modulator with a facility for modulating the trailer control pressure and an integrated tractor vehicle protection valve according to a fifth exemplary embodiment of the invention.

FIG. 5 shows a further exemplary embodiment of the invention with a holding valve 2 integrated into the parking brake modulator 1, with it being possible for the control pressure provided at the compressed air control outlet 17 for the trailer vehicle to be modulated in the parking brake modulator 1. Here, the exemplary embodiment in FIG. 5 is substantially the same as the exemplary embodiment in FIG. 3. Instead of the electromagnetic valve 64, however, an electromagnetic valve 81 is installed. The electromagnetic valve 81 has two inlets, two outlets and two possible states. In the electrically de-energized state, the mode of operation of the exemplary embodiment in FIG. 5 is the same as the mode of operation of the exemplary embodiment in FIG. 2. Specifically, the control pressure cannot be modulated. In the electrically energized state of the electromagnetic valve 81, however, the pressure in the compressed air line 61 can be modulated by means of the electromagnetic valve 12'. The largest of the pressures in the compressed air lines 61, 19 and 20 is equal to the pressure that prevails downstream of the select-high valve 62 in the compressed air line 63 and that, when the holding valve 2 is in the pass-through position, prevails at the compressed air control outlet 17 of the parking brake modulator 1.

An advantage of the use of the electromagnetic valve 81 over the use of the electromagnetic valve 64 in the exemplary embodiment according to FIG. 3 is the lower number of connections of the electromagnetic valve, and the low number of branches in the compressed air lines 65 and 13. Specifically, the electromagnetic valve 64 of the exemplary embodiment in FIG. 3 has six connections for compressed air lines, while the electromagnetic valve 81 of the exemplary embodiment in FIG. 5 has only four connections for compressed air lines.

A further difference of the exemplary embodiment in FIG. 5 in relation to the exemplary embodiment in FIG. 3 is in the measurement of the pressures in the compressed air lines.

Specifically, a pressure sensor 82 is installed in the exemplary embodiment of FIG. 5 instead of the pressure sensor 67 according to FIG. 3. It is possible by means of the pressure sensor 82 to measure not the pneumatic pressure in the compressed air line 65 but rather the pneumatic pressure in the compressed air line 16 or at the compressed air control outlet 17 of the parking brake modulator 1. A pressure drop at the compressed air control outlet 17 can therefore be quickly detected by means of the pressure sensor 82. In the event of a pressure drop at the compressed air control outlet 17, the holding valve 2 should shut off the connection between the compressed air line 63 and the compressed air line 16 or the compressed air control outlet 17 of the parking brake modulator 1. For this purpose, a fast deaeration of the compressed air line 13 is required. In most cases, both the compressed air line 16 and also the compressed air line 13 to the trailer will be torn away simultaneously or virtually simultaneously. However, if only compressed air for the control pressure escapes via the compressed air control outlet 17, this can be detected by means of the pressure sensor 82, the electromagnetic valve 81 can thereupon be switched into the electrically de-energized state, and the compressed air lines 13 and 65 can be quickly deaerated via the electromagnetic valve 12' in the fully electrically energized state of the valve. Therefore, failure of the brake system of the tractor vehicle on account of an excessively low control pressure and/or reservoir pressure is prevented directly by means of the electromagnetic valve 12' and indirectly by means of the holding valve 2, which switches into the blocking state in the event of a pressure drop below a certain threshold value in the compressed air line 13.

Figure 6:
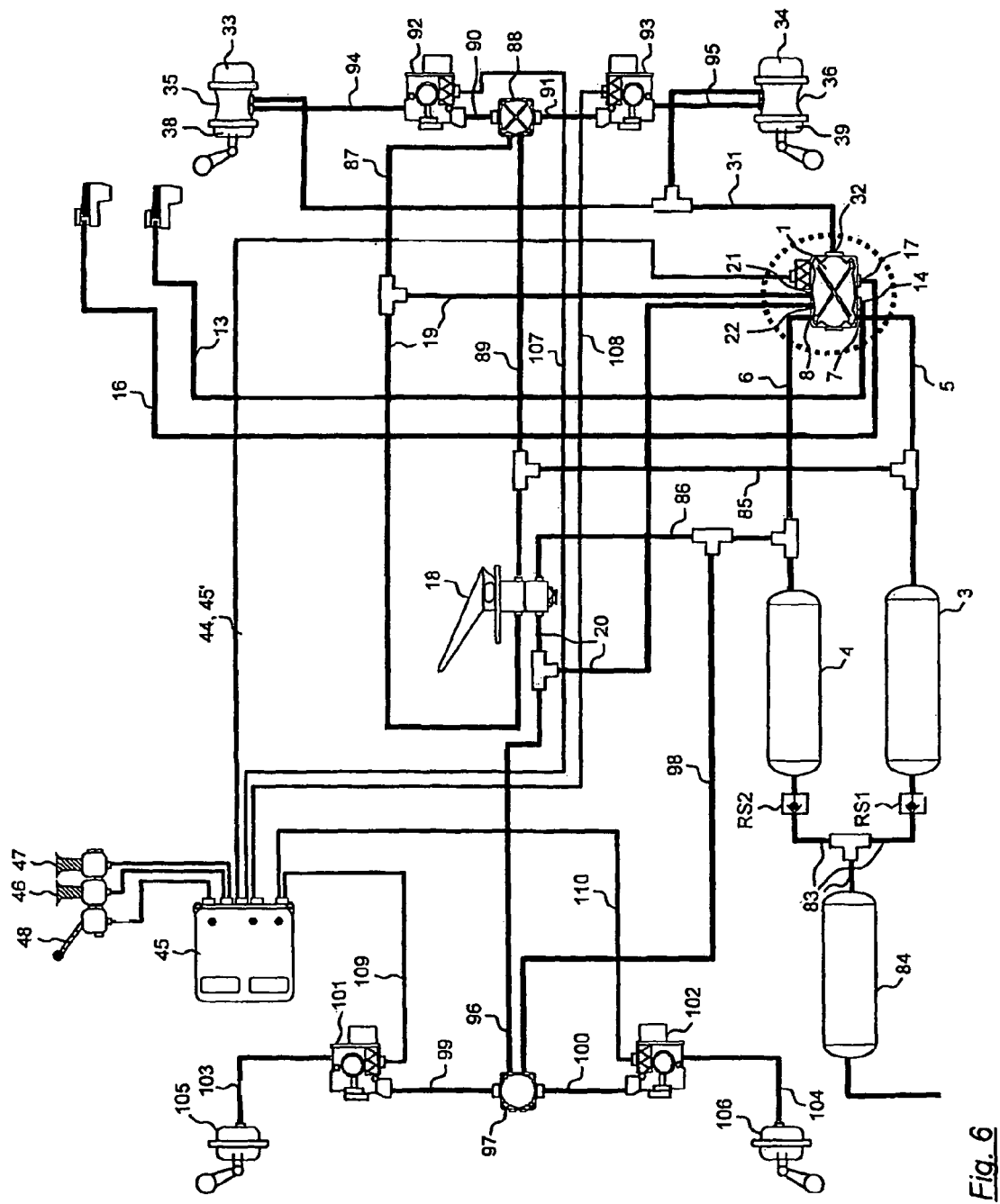
FIG. 6 is a simplified schematic diagram of a compressed air brake system having a parking brake modulator and an integrated tractor vehicle protection valve according to a sixth exemplary embodiment of the invention.

FIG. 6 shows a parking brake modulator 1, with tractor vehicle protection valve 2 integrated therein, in a compressed air brake system. FIG. 6, in contrast to FIGS. 1 to 5, illustrates further components of the compressed air brake system. The parking brake modulator 1 itself is shown only with its compressed air inlets, compressed air outlets and electrical connections, without any illustration of its internal construction. The parking brake modulator 1 may be of any desired embodiment with integrated tractor vehicle protection valve 2.

The parking brake modulator 1 has the two compressed air reservoir inlets 7 and 8. The compressed air reservoir inlets 7 and 8 are connected via the compressed air lines 5 and 6 to the compressed air reservoirs 3 and 4. The parking brake modulator 1 can be supplied with compressed air from the compressed air reservoirs 3 and 4 via the compressed air reservoir inlets 7 and 8. The compressed air reservoirs 3 and 4 are, in turn, connected via compressed air lines 83, and with the interposition of respective check valves RS1, RS2, to a further compressed air tank 84, which is connected to a compressed air supply device, in particular a compressor. Compressed air can be provided from the compressed air supply device 84 to the compressed air reservoirs 3 and 4.

FIG. 6 also shows the compressed air control inlets 21 and 22 on the parking brake modulator 1. For a first brake circuit and for a second brake circuit, the pressures output by the brake pedal device 18 can be provided via the compressed air lines 19 and 20 and the compressed air control inlets 21 and 22 to the parking brake modulator 1. Compressed air for outputting for the first brake circuit can be provided to the brake pedal device 18 from the compressed air reservoir 3 via a compressed air line 85. Compressed air for the second brake circuit can be provided to the brake pedal device 18 from the second compressed air reservoir 4 via a compressed air line 86.

The pressure in the first brake circuit with the compressed air line 19 and the pressure in the second brake circuit with the compressed air line 20 can be pneumatically and/or electropneumatically output by means of the brake pedal device 18. For an electropneumatic output of the pressures, a valve unit (not illustrated) is provided. The brake pedal device 18 then also generates a braking demand signal that can be provided to the valve unit.

The output pressure of the first brake circuit can be provided via a compressed air line 87 to a relay valve 88. The relay valve 88 can also be supplied with the reservoir pressure of the compressed air reservoir 3 via a compressed air line 89. The relay valve 88 is an air-quantity-boosting valve unit that provides the pressure output in the compressed air line 87 with boosted air quantity to the service brake parts 38 and 39 of the combined spring store/diaphragm brake cylinders 35 and 36 via compressed air lines 90 and 91, anti-lock brake system (ABS) valves 92 and 93 and compressed air lines 94 and 95. The service brake function can be performed at wheels of a rear axle of a vehicle by means of the combined spring store/diaphragm brake cylinders 35 and 36.

The locking of a wheel can be detected by means of sensors (not illustrated). For this purpose, rotational speed sensors, for example, are provided at the wheels. The signals from the sensors can be transmitted to the control unit 45. The ABS valve 92 or 93 deaerates the compressed air line 94 or 95, respectively, if locking of a wheel that is being braked by means of the combined spring store/diaphragm brake cylinder 35 or 36, respectively, is detected.

The combined spring store/diaphragm brake cylinders 35 and 36 are also connected via the compressed air line 31 to the compressed air outlet 32 of the parking brake modulator 1. The spring store parts 33 and 34 of the combined spring store/diaphragm brake cylinders 35 and 36 can therefore be aerated or deaerated by the parking brake modulator 1. The parking brake is released and engaged in this way.

The air pressure output by the brake pedal device 18 for the second brake circuit can be provided by means of a compressed air line 96 to a relay valve 97. The relay valve 97 is an air-quantity-boosting valve unit that provides compressed air, via a compressed air line 98 from the second compressed air reservoir 4, at the output pressure of the compressed air line 96 via compressed air lines 99 and 100, ABS valves 101 and 102 and compressed air lines 103 and 104, to brake cylinders 105 and 106 for braking wheels at a front axle of a vehicle.

The mode of operation of the ABS valves 101 and 102 corresponds to the mode of operation of the ABS valves 92 and 93. Sensors (not illustrated) are provided to detect locking of wheels that can be braked by means of the brake cylinders 105 and 106. Signals can be transmitted from the sensors to the control unit 45 via data lines (not illustrated).

In the drawing figures, the ABS valves 92, 93, 101 and 102 can be controlled by the control unit 45 via electrical lines 107, 108, 109 and 110.

The present invention is not restricted to the exemplary embodiments shown here. The invention also encompasses further embodiments of the parking brake modulator in which, for example, other electromagnetic valves are installed and in which a tractor vehicle protection valve 2 is integrated into the parking brake modulator 1. Here, the tractor vehicle protection valve 2 need not be a holding valve 2. It may also be some other valve or an arrangement of several other valves that has the function of a tractor vehicle protection valve 2.

Furthermore, the system boundaries of the respective parking brake modulator 1 illustrated in FIGS. 1 to 5 by dash-dotted lines may comprise more or fewer of the components encompassed by the illustrated system boundaries, that is, more or fewer components may be integrated in the parking brake modulator 1.

In the case of reduced demands on the system behavior in the event of failure of the electrical energy supply, it is possible to dispense with the function of the slow deaeration in the valves 12', 24' in FIGS. 2 to 5.

All the features specified in the above description and in the claims can, according to the invention, be used both individually and also in any desired combination with one another.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. An electropneumatic parking brake modulator for controlling a parking brake function of brakes of at least one trailer vehicle in a tractor-trailer combination, the modulator comprising:
   a first valve device for aerating and deaerating at least one of spring brake cylinders and spring store parts of combined spring store/diaphragm trailer brake cylinders;
   a first select-high valve, by which the higher of the prevailing pressure downstream of the first valve device and a service brake pressure is provided for aerating the at least one of the spring brake cylinders and the spring store parts of the combined spring store/diaphragm trailer brake cylinders;
   at least one compressed air reservoir inlet for aerating at least one compressed air line with compressed air from a compressed air reservoir of the tractor;
   at least one compressed air reservoir outlet;
   at least one compressed air control outlet;
   a compressed air line to the at least one compressed air control outlet;
   a second valve device for aerating and deaerating the at least one compressed air reservoir outlet; and
   an integrated tractor vehicle protection valve that automatically shuts off the compressed air line to the at least one compressed air control outlet when reservoir pressure provided for the at least one trailer vehicle falls below a predetermined threshold value.

2. The parking brake modulator as claimed in claim 1, wherein the tractor vehicle protection valve is a pneumatic holding valve switchable with the reservoir pressure provided for the at least one trailer vehicle.

3. The parking brake modulator as claimed in claim 2, further comprising a reservoir pressure line to the at least one trailer vehicle, and wherein the holding valve automatically shuts off the reservoir pressure line from reservoir pressure provided by the tractor when pressure in the parking brake modulator falls below a predetermined threshold value.

4. The parking brake modulator as claimed in claim 3, further comprising a pressure sensor for detecting a drop in the reservoir pressure provided for the at least one trailer vehicle, and wherein the tractor vehicle protection valve automatically shuts off the reservoir pressure provided for the at least one trailer vehicle from the reservoir pressure provided for the tractor when a drop in the reservoir pressure provided for the at least one trailer vehicle is detected due to at least one of a leak in the reservoir pressure line and a break in the reservoir pressure line.

5. The parking brake modulator as claimed in claim 4, wherein the pressure sensor detects at least two values usable to determine at least one pressure gradient over time.

6. The parking brake modulator as claimed in claim 5, further comprising a compressed air control inlet, and wherein a control pressure for the at least one trailer vehicle is increasable beyond a prevailing control pressure at the compressed air control inlet.

7. The parking brake modulator as claimed in claim 6, further comprising a second select-high valve by which the higher of the prevailing control pressure at the compressed air control inlet and a modulated pressure is provided to the at least one trailer vehicle as a control pressure.

8. The parking brake modulator as claimed in claim 7, wherein the second valve device is switchable to modulate one of the control pressure and the reservoir pressure for the at least one trailer vehicle.

9. The parking brake modulator as claimed in claim 4, further comprising at least one additional pressure sensor, and wherein the pressure sensor and the at least one additional pressure sensor detect at least two values usable to determine a spatial pressure gradient.

10. The parking brake modulator as claimed in claim 1, further comprising a reservoir pressure line to the at least one trailer vehicle that is automatically shut off from reservoir pressure provided by the tractor vehicle when pressure in the parking brake modulator falls below a predetermined threshold value.

11. The parking brake modulator as claimed in claim 10, further comprising a pressure sensor for detecting a drop in the reservoir pressure provided for the at least one trailer vehicle, and wherein the tractor vehicle protection valve automatically shuts off the reservoir pressure provided for the at least one trailer vehicle from the reservoir pressure provided for the tractor when a drop in the reservoir pressure provided for the at least one trailer vehicle is detected due to at least one of a leak in the reservoir pressure line and a break in the reservoir pressure line.

* * * * *